United States Patent
Naney

(10) Patent No.: US 6,425,929 B1
(45) Date of Patent: Jul. 30, 2002

(54) METAL CLEANER-POLISH

(76) Inventor: Carl L. Naney, Route 1, Box 322, Flora, IL (US) 62839

( * ) Notice: Subject to any disclaimer, the term of this patent is extended or adjusted under 35 U.S.C. 154(b) by 0 days.

(21) Appl. No.: 09/952,762

(22) Filed: Sep. 13, 2001

Related U.S. Application Data

(63) Continuation-in-part of application No. 09/504,553, filed on Feb. 15, 2000, now abandoned.

(51) Int. Cl.$^7$ ............................ C09K 3/14; C09G 1/02; C09G 1/04
(52) U.S. Cl. ................................ 51/308; 106/3; 106/11; 106/8; 51/307; 51/309; 134/2; 510/109; 510/242; 510/245; 510/397; 510/418; 510/499; 510/505; 510/511; 510/437
(58) Field of Search ...................... 106/3, 11, 8; 51/307, 51/308, 309; 134/2, 40, 42; 510/109, 241, 242, 245, 365, 366, 397, 418, 433, 499, 505, 507, 511, 437; 406/8

(56) References Cited

U.S. PATENT DOCUMENTS

| | | | |
|---|---|---|---|
| 4,060,496 A | * 11/1977 | Berliner | ................. 134/3 |
| 4,113,677 A | 9/1978 | Svedas et al. | |
| 5,041,235 A | 8/1991 | Kilbarger | |
| 5,094,687 A | 3/1992 | Elepano | |
| 5,968,238 A | 10/1999 | Healy et al. | |

* cited by examiner

Primary Examiner—Michael Marcheschi
(74) Attorney, Agent, or Firm—Polster, Lieder, Woodruff & Lucchesi, L.C.

(57) ABSTRACT

A metal cleaner-polish in the form of a substantially homogeneous liquid slurry containing aliphatic hydrocarbons, finely divided abrasive, and isopropanol as a stabilizer/solvent.

5 Claims, No Drawings

METAL CLEANER-POLISH

CROSS-REFERENCE TO RELATED APPLICATIONS

This is a continuation-in-part of application Ser. No. 09/504,553, filed Feb. 15, 2000 now abandoned.

STATEMENT REGARDING FEDERALLY SPONSORED RESEARCH OR DEVELOPMENT

Not applicable.

BACKGROUND OF THE INVENTION

The cleaner-polish of this invention has particular application to the fuel tanks of large trucks, but its utility is not confined thereto. The driver-owners of tractor-trailers (semis) are meticulous about the appearance of their rigs. They try to get and maintain a high shine on their fuel tanks. The existing metal cleaners-polishes for semis'fuel tanks require vigorous rubbing, with pressure, to penetrate the grime and corrosion that accumulates over time.

It is an object of this invention to provide a metal cleaner-polish that requires less effort to accomplish its purpose than metal cleaners-polishes known heretofore. Other objects will become apparent to those skilled in the art in the light of the following description.

BRIEF SUMMARY OF THE INVENTION

In accordance with this invention, generally stated, a metal cleaner-polish is provided that comprises on the order of 35–44% mineral spirits (see Merk Index, $9^{th}$ ed. No. 6052), 20–30% finely divided abrasive (such as crystalline aluminum oxide, silica crystoballite, quartz, or diatomaceous earth, and mixtures thereof, for example), 5–15% isopropyl alcohol, 5–10% kerosene, 5–10% water, 2–4% Stoddard solvent (see Merk Index, $9^{th}$ ed. No. 8602), 1–3% petroleum oil, and small amounts, (less than 1% each) of triethanolamine stearate, stearic acid and other fatty acids and glycerides and sodium gluconate. Mineral spirits, kerosene and Stoddard solvent are all species of aliphatic hydrocarbons, derived, as is petroleum oil, as distillation products from petroleum. All percentages are by weight. Elements of applicant's composition are found in commercial products: DRX-25 polishing compound, a product of PPG Industries, Inc., at 19699 Progress Drive, Strongsville, Ohio 44136; Eagle-1 Metal Polish (Big Rig formula), a product of Eagle-1 Industries, Box 4246, Carlsbad, Calif. 92018; WA300, formerly a product of Global Products Systems, Inc., 103 East Taylor, Grant Park, Ill. 60940; now replaced by LC 3567, a product of Jacksonlea, a unit of Jason Inc., 75 Progress Lane, Waterbury, Conn. 06720, but neither in the combinations of the present invention nor in their proportions.

DESCRIPTION OF THE PREFERRED EMBODIMENT

An illustrative example of a metal cleaner-polish of this invention is as follows:

41% mineral spirits
23% abrasive
   Crystalline aluminum oxide (alumina) 8.0%
   Silica crystoballite 8.0%
   Diatomaceous Earth 6.0%
   Quartz 1.0%
13% isopropanol (rubbing alcohol)
8.5% water (in addition to the amount in the Isopropanol)
8% kerosine
3% Stoddard solvent
2% petroleum oil
0.8% Triethanolamine
0.5% Stearic acid
0.2% Sodium gluconate For example, three gallons of the mixture, in a large container, are agitated until the mixture becomes homogeneous. With the introduction of the isopropanol, the mixture remains in a substantially homogeneous suspension for three or four weeks. If some precipitation of solid material occurs then, agitation will restore the suspension.

As another example, 128 ounces of DRX-25 polishing compound, 32 ounces of Eagle-1 metal polish (Big Rig formula), 128 ounces of LC 3567, 256 ounces of mineral spirits, and 80 ounces of isopropanol are mixed as above. The DRX-25 polishing compound contains kerosene, cristoballite, a crystalline silica, diatomaceous earth, petroleum oil, and quartz. The Eagle-1 metal polish contains aliphatic hydrocarbons (Stoddard type), stearic acid, and sodium gluconate. The LC 3567 contains crystalline aluminum oxide, triethanolamine stearate and water, the mineral spirits (ligroin) is refined solvent naphtha. The isopropanol (isopropyl alcohol) is in the same form as rubbing alcohol.

A key ingredient in any formula is the solvent-homogenizer alcohol. Isopropyl alcohol has been found to be the alcohol of choice. Ethanol, for example, is not as effective.

In using the metal cleaner-polish of this invention, it is only necessary to dampen a cloth or pad with the slurry, and to wipe the surface to be cleaned. It requires no pressure beyond the weight of the hand of the user, to clean the surface of a big rig fuel tank, for example.

Numerous variations in the composition of the cleaner-polish of this invention, within the scope of the appended claims, will occur to those skilled in the art and in light of the foregoing disclosure. As has been indicated in the Brief Summary of the Invention, above, the proportions of the ingredients can be varied. Merely by way of example, the amount of abrasive, particularly the silica, can be increased somewhat, for example, to 30% and the amount of mineral spirits decreased, for example, to 39%, and the amount of isopropanol, to 8%. It is preferred that the variations in the proportions be in the amounts of abrasives, aliphatic hydrocarbons, particularly mineral spirits, and isopropanol, they constituting the bulk of the ingredients, but the other components can be adjusted within limits. The amount of isopropanol preferably should not be less than 5%. These variations are merely illustrative.

What is claimed is:

1. A metal cleaner-polish comprising a homogeneous, liquid slurry containing 35–45% aliphatic hydrocarbons, 20–30% finely divided abrasive, 5–15% isopropyl alcohol and triethanol amine stearate.

2. The cleaner-polish of claim 1, further containing 5–10% water, and less than 1% of at least one component selected from the group consisting of, stearic acid, glycerides and sodium gluconate, and wherein the aliphat mineral spirits, kerosine, Stoddard solvent, or petroleum oil.

3. The cleaner-polish of claim 1 wherein the finely divided abrasive comprises crystalline alumina, silica cristoballite, diatomaceous earth, quartz or a mixture thereof.

4. A metal cleaner-polish comprising a liquid slurry containing at least 20 percent of finely divided abrasive, at least 30 percent of aliphatic hydrocarbons, at least 5 percent isopropanol and triethanol amine stearate.

5. The process of cleaning and polishing the exterior surface of fuel tanks of tractor trailers, comprising dampening a cloth or pad with the polish according to either claim 1 or claim 4, and wiping the surface with said dampened cloth or pad.

* * * * *

UNITED STATES PATENT AND TRADEMARK OFFICE
CERTIFICATE OF CORRECTION

PATENT NO. : 6,425,929 B1  
DATED : July 30, 2002  
INVENTOR(S) : Carl L. Naney

It is certified that error appears in the above-identified patent and that said Letters Patent is hereby corrected as shown below:

Column 1,
Line 20, replace "semis'fuel" with -- semis' fuel --
Line 50, replace "WA3001" with -- WA-300 --

Column 2,
Line 34, replace "no pressure" with -- no appreciable pressure --
Line 61, replace "aliphat mineral" with -- aliphatic hydrocarbons comprise mineral --

Signed and Sealed this

Seventeenth Day of December, 2002

JAMES E. ROGAN
*Director of the United States Patent and Trademark Office*